United States Patent [19]

Newman

[11] 4,053,417
[45] Oct. 11, 1977

[54] EMBOSSED SUPPORT MEMBER WITH HIGH AND LOW SKIP RIBS

[75] Inventor: Ferris E. Newman, Wauconda, Ill.

[73] Assignee: Baxter Travenol Laboratories, Inc., Deerfield, Ill.

[21] Appl. No.: 620,611

[22] Filed: Oct. 8, 1975

[51] Int. Cl.$^2$ .............................................. B01D 31/00
[52] U.S. Cl. ............................. 210/321 B; 210/494 M
[58] Field of Search .................. 210/321, 494, 321 B, 210/494 M

[56] References Cited

U.S. PATENT DOCUMENTS

| | | | |
|---|---|---|---|
| 3,738,813 | 6/1973 | Esmond | 210/321 B |
| 3,753,712 | 8/1973 | Janneck et al. | 210/321 B |
| 3,963,621 | 6/1976 | Newman | 210/321 B |

FOREIGN PATENT DOCUMENTS

| | | | |
|---|---|---|---|
| 1,037,424 | 8/1958 | Germany | 210/321 B |

Primary Examiner—Frank A. Spear, Jr.
Assistant Examiner—E. Rollins Cross
Attorney, Agent, or Firm—Paul C. Flattery; Gerald S. Geren

[57] ABSTRACT

An elongated, flexible and embossed support member is disclosed herein for use in a coil-type artificial kidney dialyzer to support an elongated, flattened and tubularly shaped semipermeable membrane. The membrane is of cellophane or a cellulose derivative and has the characteristic of stretching further in the transverse direction than in the longitudinal direction. The support member includes an imperforate fluid-impermeable web having angle ribs on one side and high and low skip ribs on the other side for positioning and supporting the membrane within the dialyzer. The angle ribs extend angularly from one longitudinal edge of the member to the other longitudinal edge. The skip ribs are arranged in alternating longitudinal rows of high and low ribs with each row including a plurality of intermittently spaced skip ribs. The height of the high skip ribs is greater than the height of the angle ribs, and the height of the low skip ribs is less than the height of the high skip ribs, with the height of all of the ribs being effective to prevent the membrane from contacting the web.

6 Claims, 3 Drawing Figures

EMBOSSED SUPPORT MEMBER WITH HIGH AND LOW SKIP RIBS

BACKGROUND OF THE INVENTION

This invention relates to coil-type dialyzers or membrane diffusion devices of the type used in artificial kidney systems; and more particularly, to a membrane support member for use in such devices.

Coil dialyzers used in artificial kidneys, such as the one disclosed in U.S. Pat. No. 3,743,098, include an elongated, tubularly-shaped semipermeable membrane and a membrane support member which are wound together about a cylindrical core. Blood from a patient flows through the dialyzer inside the membrane and dialysis solution flows through the dialyzer in a crosswise direction. The dialysis solution flows between the windings of the membrane and support member so as to contact the membrane and receive bodily waste products from the blood.

The membrane support disclosed in U.S. Pat. No. 3,743,098 is a foraminous screen. Recently, less expensive embossed support members have been developed which include an imperforate center web having equal-height support ribs on each side. The ribs engage and position the membrane in the dialyzer, as well as define flow channels between the support member and membrane for the dialysis solution.

The membrane is made of cellophane or cellulose derivative, such as is sold under the trade name Cuprophan. Such materials have the characteristic of stretching more in the transverse direction than in the longitudinal direction. It is believed that when the embossed support members are used, the transverse stretching of the membrane may permit the sides and longitudinal edges of the membrane to contact the web, and thereby reduce the effectiveness of the dialyzer by inhibiting flow of the dialysis solution.

It is therefore an object of this invention to provide an improved embossed support member which prevents the sides and longitudinal edges of the membrane from contacting the support member web.

The foregoing and other objects and advantages will be apparent from the following description and appended claims taken in conjunction with the accompanying drawings.

SUMMMARY OF THE INVENTION

There is provided by virtue of this invention an embossed support member which is constructed so as to prevent the sides and longitudinal edges of the membrane from contacting the support member web.

In addition to the web, the support member includes: longitudinally-extending rows of high and low skip ribs provided on one side of the web; and angle ribs on the other side. The membrane and support member are wound in a coil, and the skip ribs define a plurality of sinuous flow channels for passage of dialysis solution along one side of the membrane, and the angle ribs define angular flow channels for passage of dialysis solution along the other side of the membrane.

The high skip ribs have a height greater than that of the angle ribs to accommodate for stretching of the membrane so as to prevent the sides of the membrane from contacting the web. The low skip ribs are shorter than the high skip ribs and are arranged in rows which are positioned between the rows of higher skip ribs. The short skip ribs prevent the longitudinal upper and lower edges of the membrane from contacting the web and blocking the sinuous flow channels.

The height of all of the ribs prevents membrane-to-web contact. Furthermore, all of the ribs have rounded tips which permit them to gently engage the membrane and minimize damage thereto.

DESCRIPTION OF THE ILLUSTRATIVE EMBODIMENT

Figure 1:
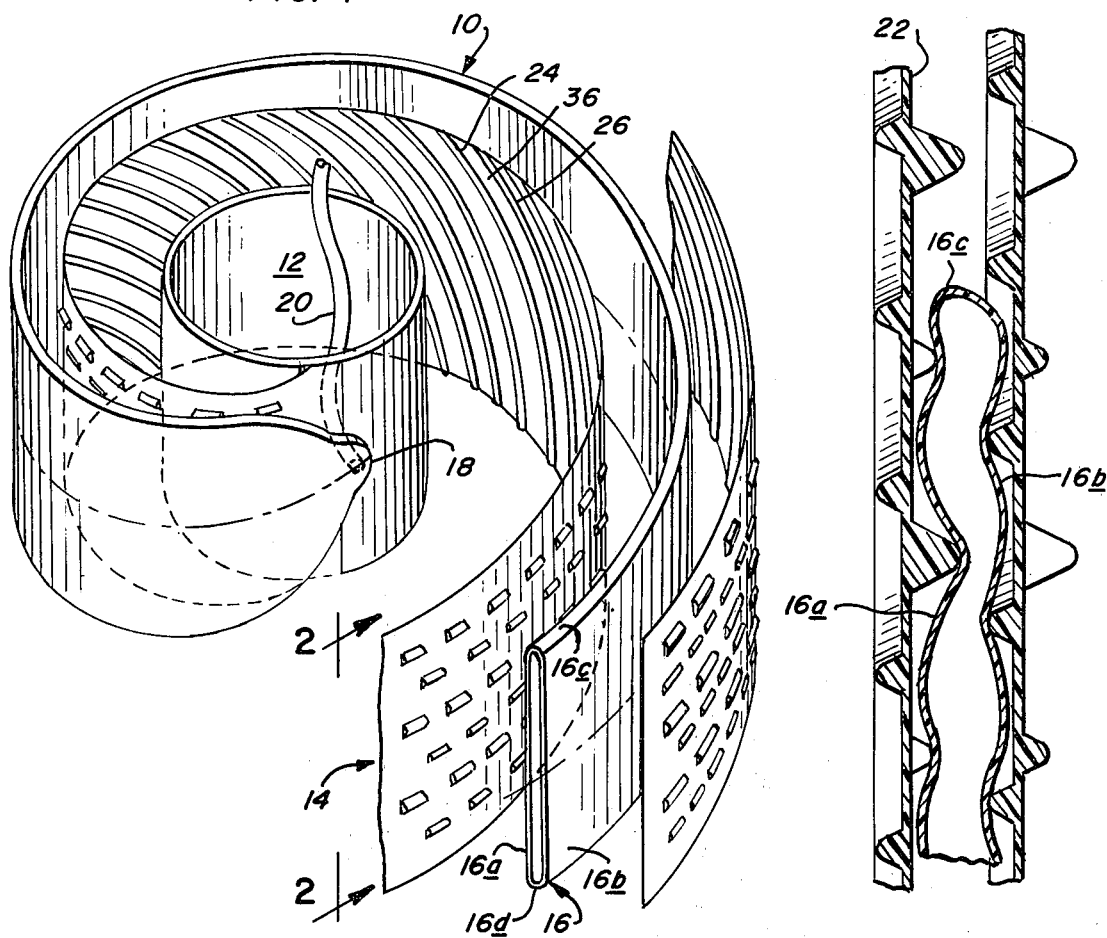
FIG. 1 is an exploded, fragmentary, perspective view of a coil dialyzer showing the tubularly-shaped semipermeable membrane and the embossed support member wound together about a cylindrical core.

Referring to the drawings, there is shown a membrane diffusion device 10, such as a coil dialyzer, of the type used in an artificial kidney system. The dialyzer includes a hollow cylindrical core 12, about which is wound an elongated flexible support member 14 and a flat, tubular semipermeable membrane 16. The support member and membrane are coiled together in a manner such that both sides of the membrane are supported and engaged by the support member 14.

The membrane 16 is made of cellophane or a cellulose derivative (such as sold under the trade name Cuprophan) and serves as the conduit for blood passing through the dialyzer. Cellophane membranes have the characteristic that when filled with fluid, they stretch approximately three times further in the transverse direction than in the longitudinal or blood flow direction. In the dialyzer, membrane is tubularly shaped and has an oblong cross-sectional configuration with vertical sidewalls 16a and 16b and longitudinal upper and lower edges 16c and 16d. The inlet end 18 of the membrane is secured to the core 12 and a blood inlet tube 20 which carries blood from a patient, extends through the wall of the core and is connected at one end to the membrane inlet end 18. The outlet end (not shown) of the membrane is positioned radially outward from the core and is connected to an outlet tube (not shown) for directing treated blood back to the patient.

The support member 14 is a flexible, embossed member which is made of fluid-impermeable material, such as polypropylene or medium density polyethylene. The member is slightly wider and longer than the membrane so as to assure support for the membrane.

The support member includes a central imperforate web 22; a plurality of outwardly extending angle ribs, such as 24 and 26, on one side of the web; and a plurality of longitudinally-extending rows of high skip ribs 28 and 30 and low skip ribs 32 and 34 on the other side. One end of the member 14 is secured to the core, and thus by winding the support member with the membrane, the membrane is supported on both sides by the support member.

The angle ribs, such as 24 and 26, have rounded tips and extend from the bottom longitudinal edge of the web to the top longitudinal edge at an angle between 45° and 60° with about 45° being preferred. The ribs are generally parallel to each other and are spaced apart a distance of between about 0.06 to 0.1 inches with about 0.080 inches being preferred. The angle ribs are between 0.010 and 0.020 inches high with 0.018 inches being preferred.

In this arrangement, the angle ribs cooperate with the membrane to define a plurality of diagonally-oriented angular flow channels 36. The continuous nature and angular orientation of the angle ribs prevent membrane-to-web contact resulting from the transverse stretch, and the height of the ribs prevents the longitudinal stretch from causing contact. Thus the angle ribs prevent contact and maintain the membrane in position spaced from the web.

Each row of high skip ribs includes a plurality of intermittently-spaced, longitudinally-oriented, triangularly-shaped ribs or segments, such as 28a, 28b, 30a and 30b.

The rows are staggered so that rib 28b in one row faces the gap between the ends of two ribs 30b and 30a in another row. The longitudinal row arrangement enhances blood flow in the longitudinal direction and the intermittent spacing and staggering in cooperation with the membrane permits the formation of vertically-oriented sinuous flow paths or channels, such as 38, through the rows. The spacing between the longitudinal rows of high skip ribs is between 0.12 and 0.14 inches with 0.125 being preferred. This spacing is greater than the spacing between the angular ribs.

Each high skip rib is about 0.160 inches long and 0.062 inches wide at the base. The high skip ribs are taller than the angle ribs and are between 0.028 and 0.038 inches high with a height of 0.034 inches being preferred. The distance between the ends of the high skip ribs in a row is between 0.060 and 0.100 inches with 0.080 inches being preferred. In the embodiment shown, the high skip ribs are positioned to contact the inwardly facing sidewall 16a of the membrane. Longitudinal membrane stretch is accommodated by the length of the skip ribs and by the spacing between adjacent skip ribs in the same row. On the other hand, transverse stretch can cause droop between the rows of ribs, but the height of the skip ribs is effective to prevent the membrane from contacting the web. The high skip ribs are taller than the angle ribs, since the droop between the rows of skip ribs is greater than between the rows of angle ribs.

Each row of low skip ribs includes a plurality of intermittently-spaced, longitudinally-oriented, and triangularly-shaped ribs or segments, such as 32a, 32b, 32c, 34a, 34b and 34c. Each row of skip ribs is centrally positioned between two rows of high skip ribs. The rows of low skip ribs are generally parallel to the rows of higher skip ribs and are also aligned so as to be positioned opposite a gap between skip ribs in one of the two adjacent rows of high skip ribs. For example, low skip rib segment 32a is positioned opposite the gap formed by the high ribs 30a and 30b and the low skip rib 32b is positioned between the gap between the high skip ribs 28b and 28a. The positioning of the low skip rib segments opposite the gaps in the high rows of skip ribs also cooperates in the formation of the sinuous flow channels for the dialysis solution.

The low skip ribs are shorter than both the angle ribs and the high skip ribs and are between about 0.010 and .020 inches high with a height of 0.015 inches being preferred. Each low skip rib is about 0.062 inches long and about 0.025 inches wide at the base. The space between adjacent low skip ribs is approximately 0.038 inches.

Figure 2:
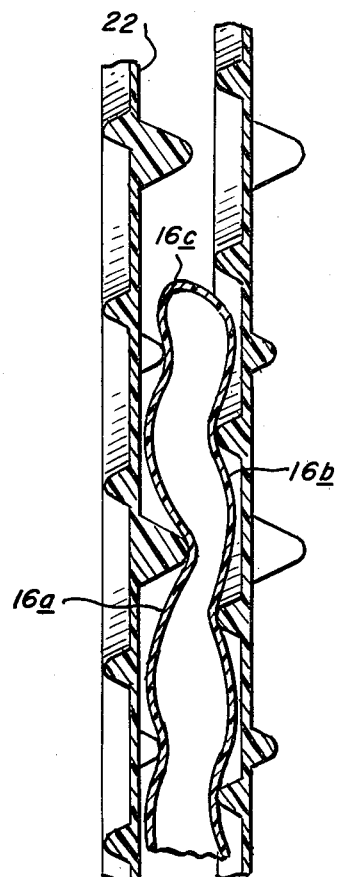
FIG. 2 is an enlarged fragmentary cross-sectional view taken substantially along line 2—2 of FIG. 1 and showing the upper portion of the membrane as supported by the skip ribs on one side and angle ribs on the other side.
Figure 3:
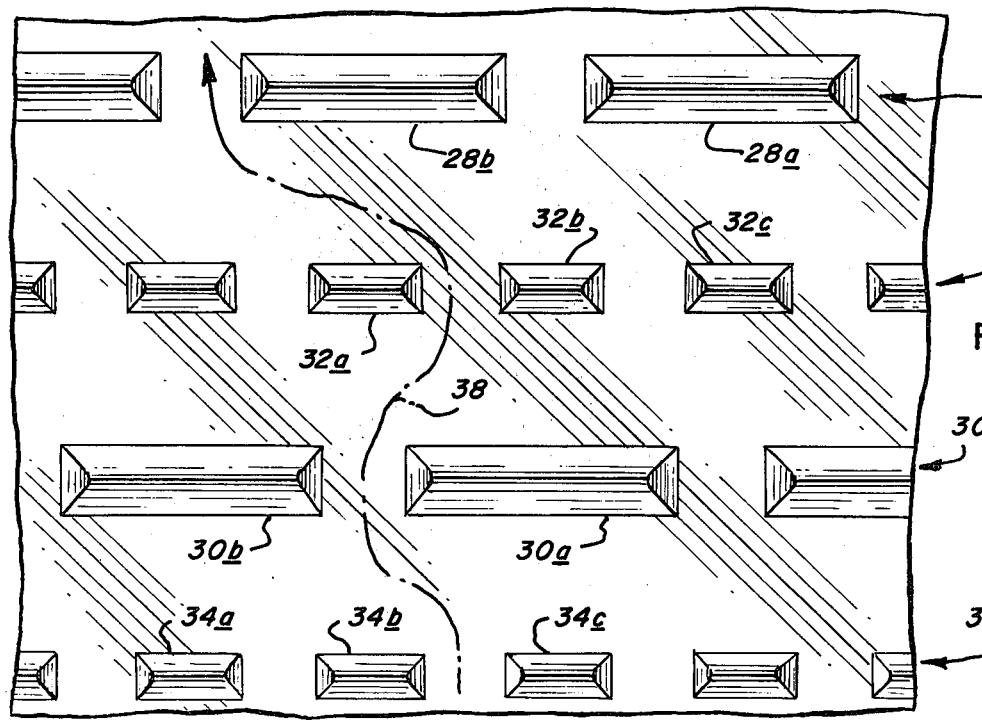
FIG. 3 is a greatly enlarged plan view of a portion of the skip rib side of the support member.

The low skip ribs, such as 32b, are particularly effective to prevent the top or bottom longitudinal edges, such as 16c, of the membrane from contacting the web between adjacent rows of high skip ribs as is seen in FIG. 2. In the preferred structure the web is 0.004 inches thick, the angle rib is 0.018 inches high and the high skip ribs is 0.034 inches high so that the total thickness of the member is 0.056 inches. With this construction a clearance of 0.005 inches is assured between the web and membrane.

It has been found that the height of the high skip ribs, low skip ribs, and angle ribs are effective to prevent the sidewalls, as well as the longitudinal edges of the membrane, from contacting the support member web. It has also been found that the spacing between the rows of skip ribs must be proportionally related to the spacing between the angle ribs so as to effectively maintain substantially equal dialysis solution flow on both sides of the membrane as well as control the blood and the dialysis solution pressure.

It will be appreciated that numerous changes and modifications can be made to the embodiment shown herein without departing from the spirit and scope of this invention.

What is claimed is:

1. An embossed and elongated flexible support member for use in a coil dialyzer for supporting an elongated semipermeable membrane, which membrane is characterized by stretching further in the transverse direction than in the longitudinal direction, said support member comprising:
    an elongated imperforate impermeable web;
    means on one side of said web defining a plurality of angle ribs for engaging and supporting said membrane and for cooperation in defining a plurality of angular flow channels;
    means on the other side of said web defining a plurality of high skip ribs and a plurality of low skip ribs, said high ribs and said low ribs being arranged in longitudinally extending rows with the ribs in each row being spaced from each other, with the rows of low skip ribs being positioned intermediate the rows of high skip ribs, and the spacing between ribs in a row cooperating in defining sinuous flow channels through said rows;
    the height of said skip ribs and said angle ribs being effective to prevent contact between the membrane and the web; and
    the configuration of said high skip ribs, said low skip ribs and the spacing between the ribs being dimensioned to maintain substantially equal flow rates on both sides of the membrane.

2. A member as in claim 1, wherein said membrane has upper and lower longitudinal edges and said lower skip ribs are positioned to prevent said edges from contacting said web.

3. A member as in claim 2, wherein said high skip ribs are uniformly of a height greater than substantially all said angle ribs, and said low skip ribs are of a height lower than said high skip ribs.

4. A member as in claim 2, wherein said each low skip rib is positioned opposite the space between two high skip ribs in an adjacent row.

5. A member as in claim 1, wherein said ribs are of a size and shape for cooperation with said membrane in defining flow channels for substantially equal flow rates.

6. An embossed and elongated flexible support member for use in a coil dialyzer for supporting an elongated semipermeable membrane, which membrane is characterized by stretching further in the transverse direction than in the longitudinal direction, said support member comprising:

an elongated imperforate impermeable web;

means on one side of said web defining a plurality of angle ribs for engaging and supporting said membrane and for cooperation in defining a plurality of angular flow channels;

means on the other side of said web defining a plurality of high skip ribs and a plurality of low skip ribs, said high ribs and said low ribs being arranged in longitudinally extending rows with the ribs in each row being spaced from each other, with the rows of low skip ribs being positioned intermediate the rows of high skip ribs, and the spacing between ribs in a row cooperating in defining sinuous flow channels through said rows; and the height of said high skip ribs being uniformly greater than the height of substantially all said angle ribs, said low skip ribs being of a height lower than the height of said high skip ribs and said angle ribs wherein the height and space between said ribs and the shape of said ribs cooperate with the membrane to form channels on either side of the membrane of substantially equal flow rates.

* * * * *